No. 707,862. Patented Aug. 26, 1902.
W. H. NETHERLAND.
STANDARD FOR MEASURING HORSES.
(Application filed Dec. 11, 1901.)
(No Model.) 2 Sheets—Sheet 1.
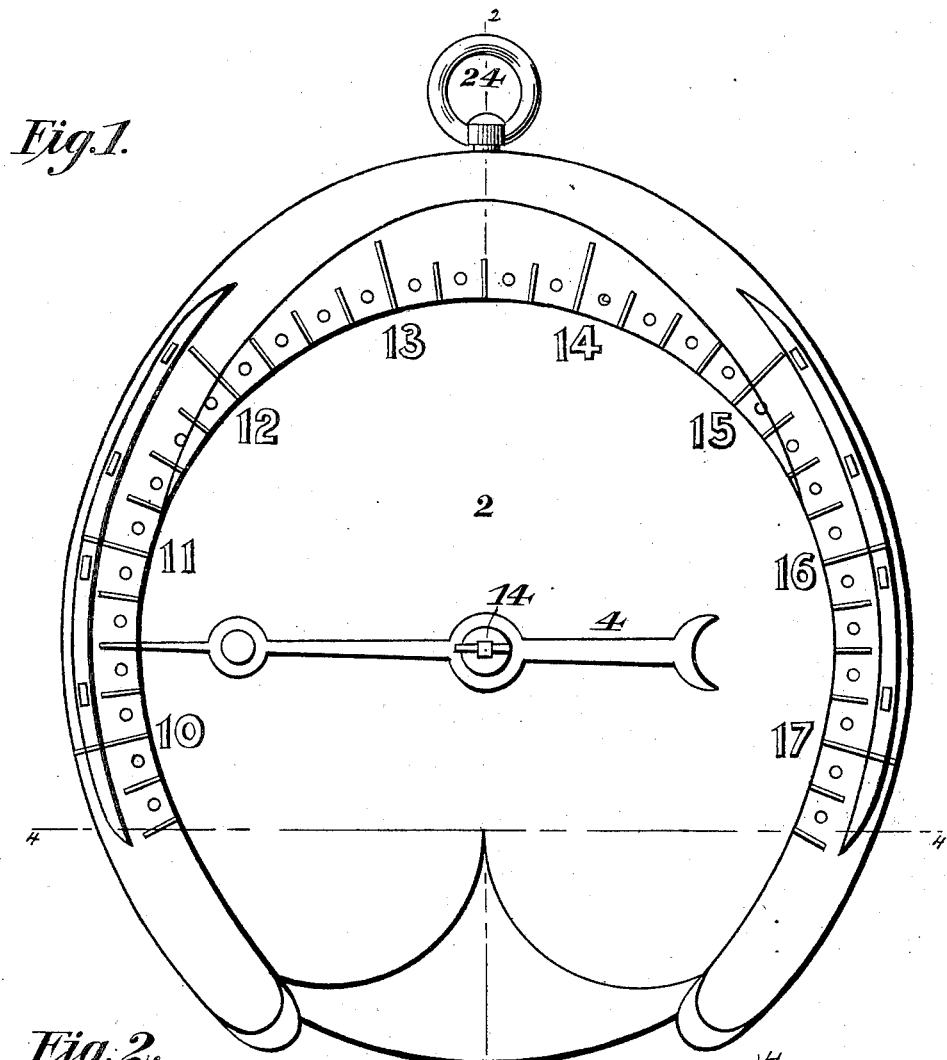
Fig.1.
Fig.2.
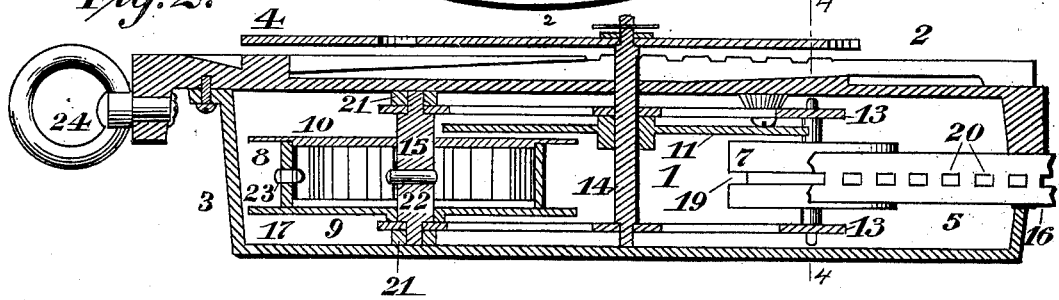
Witnesses
Annie B. Knobel
Henry Pirtle.
Inventor
W. H. Netherland
By Attorney
Abraham Knobel No. 707,862. Patented Aug. 26, 1902.
W. H. NETHERLAND.
STANDARD FOR MEASURING HORSES.
(Application filed Dec. 11, 1901.)
(No Model.) 2 Sheets—Sheet 2.
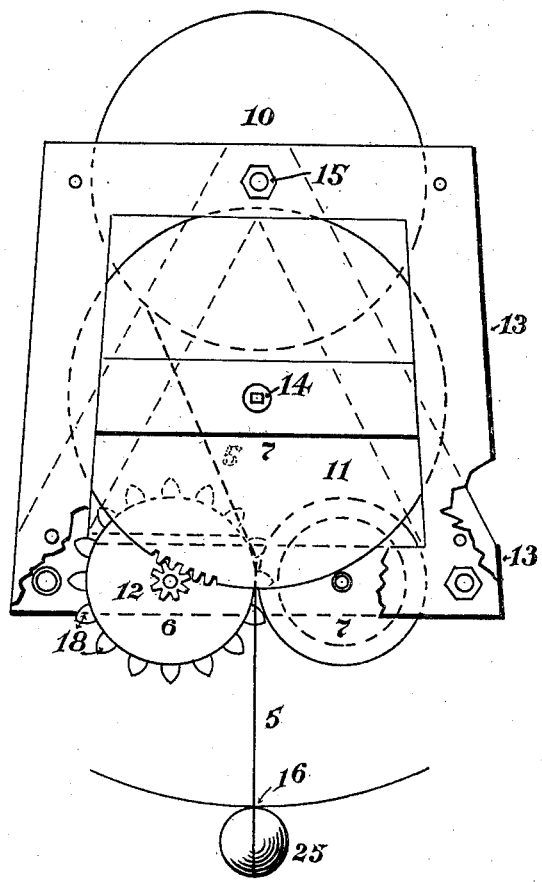
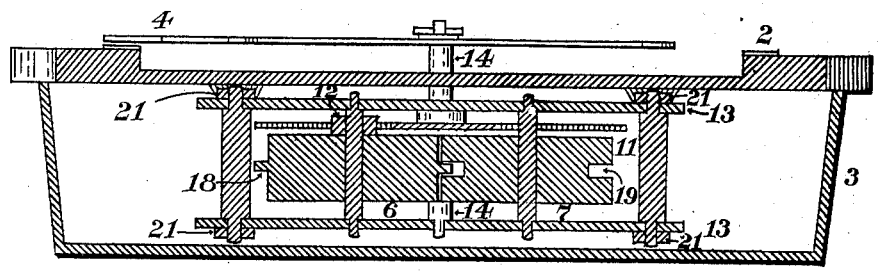

UNITED STATES PATENT OFFICE.

WILLIAM HEGAN NETHERLAND, OF LOUISVILLE, KENTUCKY.

STANDARD FOR MEASURING HORSES.

SPECIFICATION forming part of Letters Patent No. 707,862, dated August 26, 1902.

Application filed December 11, 1901. Serial No. 85,540. (No model.)

*To all whom it may concern:*

Be it known that I, WILLIAM HEGAN NETHERLAND, a citizen of the United States, residing at Louisville, in the county of Jefferson and State of Kentucky, have invented a new and useful Standard, of which the following is a specification.

My invention relates to standards for measuring horses; and the objects of my improvement are, first, accuracy; second, saving of time; third, to provide a standard which will not frighten horses, as is the case with poles; fourth, facility in measuring, and, fifth, simplicity of construction. I attain these objects by means of the mechanism illustrated in the accompanying drawings, in which—

Figure 1 is a front elevation; Fig. 2, a vertical section on the line 2 2; Fig. 3, a front elevation of the mechanism removed from its case, and Fig. 4 a horizontal section on the line 4 4.

Similar numerals refer to similar parts throughout the several views.

The mechanism 1, the dial 2, and the cover 3 constitute the body of the instrument.

4 is the hand or indicator; 5, the measuring-tape; 6, the pin-wheel; 7, the grooved idler; 8, the groove in the drum in which the tape is wound; 9, the body of the drum; 10, the cover for the winding-drum; 11, the center gear; 12, the pinion; 13, the frame of the mechanism; 14, the center shaft; 15, the stationary post in frame to which the spring is fixed; 16, the slot cut in the dial-casting, through which the tape plays; 17, the winding-spring; 18, the teeth on the pin-wheel; 19, the groove in the idler 7; 20, the pin-holes in the measuring-tape 5; 21, the nuts for holding frame 13 together; 22, the pin for holding spring 17 to 15; 23, the pin for holding spring 17 to drum 9 and also for holding 5 to 9, and 24 is the swivel-ring for suspending the instrument.

The dial 2 is preferably cast with the graduations and numbers in relief and made in the shape of a horseshoe. On the rear of this dial are cast lugs, onto which the frame of the mechanism 13 is screwed, and a projection, into which is cut the tape-slot 16. It has also another backward projection at its top to which is secured the swivel-ring 24, by which the instrument is suspended for use. Its center is pierced by a hole through which passes the end of the center shaft 14. To 14 is secured the hand 4.

The mechanism 1 is covered by a cover 3, cast or made of sheet metal and provided with lugs on its rim by which it is secured with screws to the back of dial 2. The mechanism 1 consists of a drum 9, actuated by a coil-spring 17, a pin-wheel 6, an idler 7, a tape 5, a pinion 12 on the axis of the pin-wheel 6, and a center gear 11, to the axis 14 of which is secured the hand 4. The drum 9 is hollow and contains a clock-spring which keeps the tape normally wound up. The spring is attached to the stationary post 15 at its inner end and at its outer end to the inside of the drum. The end of the tape may be fastened to the bottom of the groove by the same pin which holds spring 17. The cylindrical part of the drum is integral with one side. The other side has a shoulder which fits into the drum. The centers of the sides form bearings on which the drum revolves about the post 15. There is no gear connection with the drum, and it serves only to take up the tape when released. In the lower part of the mechanism is the pin-wheel 6. It is cylindrical in shape and has a row of teeth 18, whose working faces are of cycloidal curvature. These teeth are preferably made flat on their sides, so as to start into the rectangular holes in the tape; but they may be made round or in any other shape. Articulating with this pin-wheel is the grooved idler 7, which serves to keep the tape always in contact with pin-wheel 6, so as to insure the teeth entering the rectangular holes 20 in the tape. The groove in 7 is wide and deep enough to accommodate the teeth 18. The tape 5 plays between these two wheels 6 and 7 and actuates the pin-wheel 6 positively. Attached to 6 is a pinion which revolves with it and transmits its motion to the center gear 11, which in turn moves the hand 4. These parts coact as follows: The tape 5 is pierced along its middle with rectangular holes 20, as at present constructed one-eighth of an inch long and one-sixteenth of an inch wide, having a pitch of one-fourth of an inch. The teeth are of such dimensions at their base as to fit into the holes in the tape, and their sides taper toward the point slightly, so as to insure their entering the holes. The working faces of the teeth are cycloidal. There are sixteen teeth on the wheel 6, and the circumference is four inches. The pinion 12 has seven teeth and the center gear 11 eighty-four teeth. The long graduations on the dial represent twelfths of a revolution and are divided into fourths by the shorter lines and eighths by the dots. When the tape therefore moves four inches, the pin-wheel 6 makes one revolution and the indicator on the dial one-twelfth of a revolution or one complete division or one hand, which is four inches. The graduations on the dial are from "9½" to "17½" inclusive, this being regarded sufficient to include all horses and ponies. The two halves of a ball 25 or of a disk are secured to the tape at the proper point along its length. The bottom surface of this ball or disk serves as the measuring-point. When the tape is released, the ball 25 strikes the walls of slot 16 and remains there by the force of the spring 17.

In use the instrument is suspended by means of the swivel-ring 24 from the ceiling of the stable or in some other convenient way so that the bottom of ball 25 is eight feet from the floor. This is considered high enough to escape the heads of riders, buggy-tops, &c. An extension of tape or cord may be attached to the ball, that it may be drawn down and reached conveniently for use. The horse to be measured is led under the standard and the tape drawn down till the ball 25 touches his withers. The hand on the dial indicates the height in hands, inches, and half-inches. This does not frighten the horse, as is the case when a pole or other apparatus is brought near him, and he does not move or shrink and shiver with fear, but can be measured accurately. In the case of its use in sales-stables there is the advantage of having the measurement in plain sight of every one interested.

Having thus described my invention and its use, so that any one skilled in the art pertaining thereto may make and use it, I desire not to be limited to the particular construction indicated, nor do I claim all the parts, broadly, for I am aware that perforated belts and tapes and pin-bestudded pulleys and wheels have been used; but

What I do claim as my invention, and desire to secure by Letters Patent, is—

1. In a standard for measuring horses, the combination with a case, of a metal tape perforated on its median line with a row of holes of such a size and shape as to fit snugly the teeth of a pinion which enter said holes; a pinion, having gear-teeth which mesh with said holes of said tape as with a rack, and continuously actuated thereby; a non-adjustable idler articulating with said pinion in such a manner as to keep said tape always in contact with the trough of said pinion; a second pinion, moving with said pinion; a center gear meshing with said second pinion; a center shaft passing through and moving with said center gear; a hand or indicator attached to the outer end of said center shaft; and a dial having graduations indicating hands and fractions of a hand and constituting the entire front cover of the case, substantially as and for the purpose specified.

2. In a standard for measuring horses, the combination of a case, a graduated dial constituting the front cover of said case, a hand or indicator adapted to traverse said dial, a gear-train for actuating said hand or indicator, and an ungraduated metal tape having a median line of holes of such a size and shape as to fit accurately articulating gear-teeth of a pinion, and a suspension-ring on the top of said case, substantially as and for the purpose specified.

3. As a new article of manufacture, a standard for measuring horses, consisting of a case suspended at a predetermined and fixed height above the object the height of which is to be measured, a graduated dial on the surface of said case, a hand or pointer traversing said graduated dial, and a tape perforated on its median line with a row of equidistant holes and adapted to be drawn down to the object to be measured, also coacting as to automatically subtract the distance of said case above the object to be measured from the height of said case, and show immediately on said dial the height of said object, substantially as specified.

WM. HEGAN NETHERLAND.

Witnesses:
MARY M. EWING,
W. A. EVANS.